United States Patent
Vogel et al.

[11] Patent Number: 5,991,180
[45] Date of Patent: Nov. 23, 1999

[54] AUXILIARY OPEN CIRCUIT VOLTAGE POWER SUPPLY

[75] Inventors: Bernard Vogel, Troy, Ohio; Steven Geissler, Little Chute, Wis.

[73] Assignee: Illinois Tool Works Inc., Glenview, Ill.

[21] Appl. No.: 09/113,042

[22] Filed: Jul. 9, 1998

[51] Int. Cl.[6] .............................. H02M 5/42; B23K 9/10
[52] U.S. Cl. .............................. 363/89; 363/17; 363/97; 219/130
[58] Field of Search .................................. 363/89, 20, 21, 363/37, 142; 323/285, 282; 219/130.51, 130.21

[56] References Cited

U.S. PATENT DOCUMENTS

| | | | |
|---|---|---|---|
| 4,533,986 | 8/1985 | Jones | 363/17 |
| 5,601,741 | 2/1997 | Thommes | 363/142 |
| 5,811,757 | 9/1998 | Higgins . | |
| 5,815,386 | 9/1998 | Gordon . | |
| 5,824,990 | 10/1998 | Geissler et al. | 219/130.21 |

*Primary Examiner*—Shawn Riley
*Assistant Examiner*—Rajnikant B. Patel
*Attorney, Agent, or Firm*—George R. Corrigan

[57] ABSTRACT

A method and apparatus for welding power includes an input rectifier, a pre-regulator, a convertor, an auxiliary voltage circuit and a controller. The pre-regulator is connected to receive a rectified voltage and provides a dc bus. The convertor converts the bus to a welding output. The auxiliary voltage circuit is connected across the welding output, in parallel with the converter. The controller shuts the converter down in the event an open circuit condition exists at the output, thus providing a safer open circuit voltage.

18 Claims, 8 Drawing Sheets

AUXILIARY OPEN CIRCUIT VOLTAGE POWER SUPPLY

FIELD OF THE INVENTION

This invention relates generally to power sources used in welding and, more particularly, to welding power sources that have a pre-regulator and an open circuit auxiliary voltage circuit.

BACKGROUND OF THE INVENTION

Power sources typically convert a power input to a necessary or desirable power output tailored for a specific application. In welding applications, power sources typically receive a high voltage, alternating current, (VAC) signal and provide a high current welding output signal. Around the world, utility power sources (sinusoidal line voltages) may be 200/208 V, 230/240 V, 380/415 V, 460/480 V, 500 V and 575 V. These sources may be either single-phase or three-phase and either 50 or 60 Hz. Welding power sources receive such inputs and produce an approximately 10–75 volt, DC or AC high current welding output.

There are many types of welding power sources that provide power suitable for welding. Some prior art welding sources are resonant converter power sources that deliver a sinusoidal output. Other welding power sources provide a squarewave output. Yet another type of welding power source is an inverter-type power source.

Converter-type power sources are particularly well suited for welding applications. Converter-type power sources can provide an ac square wave or a dc output. Converter power sources also provide a relatively high frequency stage, which provides a fast response in the welding output to changes in the control signals.

There are several well known types of converter power sources that are suitable for welding. These include boost power sources, buck power sources, and boost-buck power sources. Traditionally, welding power sources were designed for a specific power input. In other words, the power source cannot provide essentially the same output over the various input voltages. More recently, welding power sources have been designed to receive any voltage over a range of voltages, without requiring relinking of the power supply. One prior art welding power supply that can accept a range of input voltages is described in U.S. Pat. No. 5,601,741, issued Feb. 11, 1997 to Thommes, and owned by the assignee of the present invention, and is hereby incorporated by reference.

Many prior art welding power supplies include several stages to process the input power into welding power. Typical stages include an input circuit, a pre-regulator, a convertor and an output circuit that includes an inductor. The input circuit receives the line power, rectifies it, and transmits that power to the pre-regulator. The pre-regulator produces a dc bus suitable for conversion. The dc bus is provided to the convertor of one type or another, which provides the welding output. The output inductor helps provide a stable arc.

International safety requirements for welding machines often require the open-circuit/output voltage to not exceed 113 volts. However, welding power supplies used for stick welding typically should be able to provide at least a 65–75 volt output under load. When a forward converter is used the peak secondary voltage must be about twice the output voltage (i.e. 130–150 volts) because the pulse width may be 50% at most. This creates the potential for unacceptably high open circuit voltages. Prior art systems attempted to meet safety standards by providing a very narrow pulse width. However, even a narrow pulse could provide and unsatisfactorily high voltage when there is no load. Moreover, the narrow pulse may cause difficulty when trying to initiate a stick welding process.

The problem with high OCV is exacerbated because small capacitors are connected to the output terminals and chassis ground for suppression of high frequency interference from TIG arc starters. These capacitors will tend to be charged to the peak voltage applied to the secondary and hold this voltage.

Some prior art power supplies have a pre-load resistor that pre-loads the inverter, so that the capacitors don't charge to the peak. This resistor can present a sizable load, and a significant amount of wasted power, because of the relatively high voltage at the secondary. Also, the ripple voltage on the output may exceed the limits allowed, even with a pre-load resistor. Other prior art power supplies use an open circuit voltage regulator which electronically regulate the output to a lower limit using an error amplifier and voltage feedback. The error amplifier reduce the pulse width of the inverter and/or forces pulses to be skipped to bring the output voltage down. However, this makes the error amplifier sluggish because of the high gain of the power circuit at no load. Additionally the average output voltage may have to be reduced to a lower level to keep the peak ripple within limits. The lower level average output and/or sluggish error amplifier tend to cause difficulty with arc initiation, because the main inverter take a significant amount of time to "come alive" and to provide arc current.

Prior art pre-regulator stages typically include switches used to control the power. The losses in switches can be significant in a welding power supply, particularly when they are hard switched. The power loss in a switch at any time is the voltage across the switch multiplied by the current through the switch. Hard switching turn-on losses occur when a switch turns on, with a resulting increase in current through the switch, and it takes a finite time for the voltage across the switch to drop to zero. Soft switching attempts to avoid turn-on losses by providing an auxiliary or snubber circuit with an inductor in series with the switch that limits the current until the transition to on has been completed, and the voltage across the switch is zero. This is referred to as zero-current transition (ZCT) switching.

Similarly, hard switching turn-off losses also occur when a switch turns off, with a resultant rise in voltage across the switch, and it takes a finite time for the current through the switch to drop to zero. Soft switching attempts to avoid turn-off losses by providing an auxiliary or snubber circuit with a capacitor across the switch that limits the voltage across the switch until the transition to off has been completed, and the current through the switch is zero. This is referred to as zero-voltage transition (ZVT) switching. Soft switching has not been adequately employed in welding power supplies because the circuits require expensive additional switches and/or have losses in the circuitry that help create the zero current/voltage transitions.

When it is not practical or cost effective to use a true ZCT and ZCT circuit, an approximation may be used. For example, slow voltage/current transitions (SVT and SCT) as used herein, describe transitions where the voltage or current rise is slowed (rather than held to zero), while the switch turns off or on.

Figure 1:
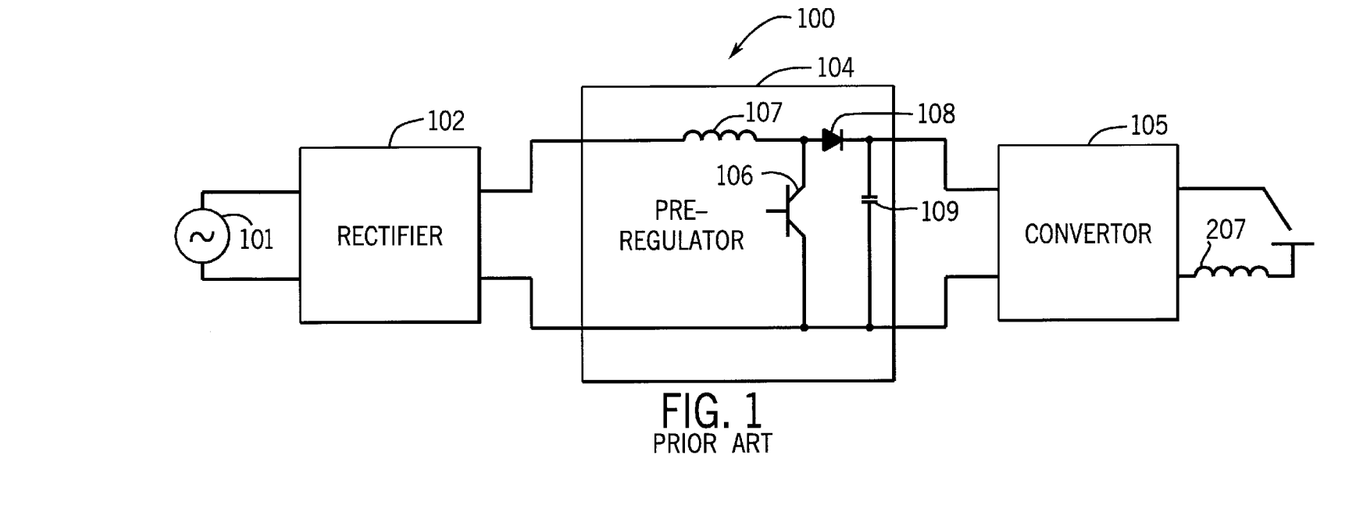
FIG. 1 is a block diagram of a prior art welding power supply having a boost convertor pre-regulator.

A typical prior art welding power supply 100 with a pre-regulator 104 is shown in FIG. 1. An input line voltage 101 is provided to a rectifier 102 (typically comprised of a diode bridge and at least one capacitor). Pre-regulator 104 is a hard-switched boost converter in the preferred embodiment, which includes a switch 106 and an inductor 107. A diode 108 allows a capacitor 109 to charge up by current flowing in inductor 107 when the switch 106 is turned off. The current waveform in inductor 107 is a rectified sinusoid with high frequency modulation (ripple).

The amount of ripple may be reduced by increasing the frequency at which switch 106 is switched. However, as the frequency of which a prior art hard switched boost converter is switched is increased to reduce ripple, the switching losses can become intolerable.

Another drawback of prior art power supplies is a poor power factor. Inductor 107 is part of the load seen by line voltage source 102, and thus the load is inductive in nature. Generally, a greater power factor allows a greater power output for a given power input. Also, it is generally necessary to have more power output to weld with stick electrodes having greater diameter. Thus, a higher power factor will allow a given welding power supply to be used with greater diameter sticks, and obtain the same performance obtained using smaller diameter sticks.

SUMMARY OF THE PRESENT INVENTION

According to a first aspect of the invention a welding power supply includes an input rectifier, a pre-regulator, a convertor, an auxiliary voltage circuit and a controller. The input rectifier receives an input sinusoidal line voltage, and provides a rectified sinusoid voltage. The pre-regulator is connected to receive the rectified voltage, and provides a dc bus as an output. The convertor converts the bus to a welding output. The auxiliary voltage circuit is connected across the welding output, in parallel with the converter. The controller shuts the converter down in the event an open circuit condition exists at the output.

The controller receives as feedback the welding output, voltage in one alternative. The controller receives output current feedback in another alternative.

The auxiliary voltage source derives power from the pre-regulator in yet another alternative.

The pre-regulator is an SVT or SCT switched pre-regulator in another alterative.

Welding power is provided, according to another aspect of the invention by rectifying an input sinusoidal line voltage and pre-regulating the rectified input to provide a dc bus as an output. The dc bus is converted to a welding output. An auxiliary voltage across the welding output, in parallel with the converter in provided. The converter is shut down when an open circuit condition is detected at the output.

An alternative embodiment includes the steps of providing output voltage feedback and output current feedback.

Another alternative includes the step of deriving the auxiliary voltage from the pre-regulator.

Yet another embodiment includes the step of SCT or SVT switching the pre-regulator. Power factor correction is provided in another embodiment.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a welding power supply using a boost converter for a pre-regulator and particular circuitry, it should be understood at the outset that other circuit topologies may be used, and the power supply may be used for other purposes, and still be within the intended scope of this invention.

Figure 2:
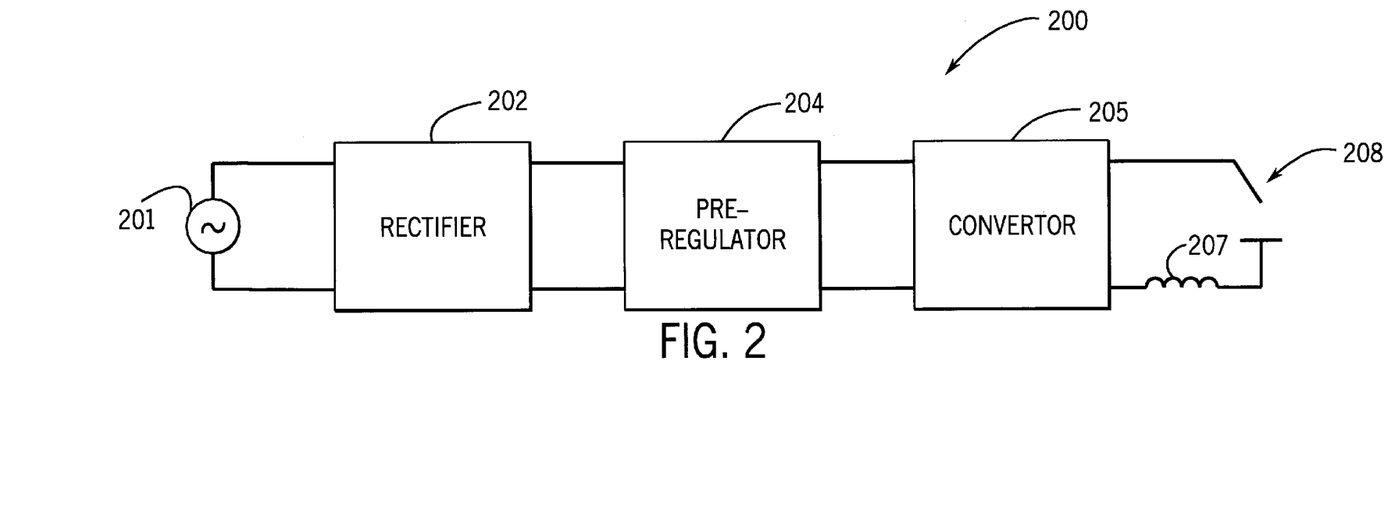
FIG. 2 is a block diagram of a welding power supply constructed in accordance with the present invention.

A block diagram of a welding power supply constructed in accordance with the preferred embodiment is shown in FIG. 2. Source 201 represents the input line voltage used to provide power to the welding power supply. The input line voltage may be anywhere between 90 and 250 volts in the preferred embodiment. The voltage typically operates at a frequency of 60 hertz (in the United States) and is single phase in the preferred embodiment (although alternative embodiments use a three phase input). Other voltages may also be used.

The input voltage is provided to a rectifier 202, which may be a simple bridge rectifier. The output of rectifier 202 is a rectified sinusoid.

A pre-regulator 204 receives the rectified sinusoid from rectifier 102 and provides a dc bus output to a convertor 205. Pre-regulator 204, in the preferred embodiment is a soft-switched boost convertor which provides close to a unity power factor. Pre-regulator 204 also allows the input voltage to be anywhere within a range of input voltages in the preferred embodiment.

Convertor 205 is a typical forward convertor (generally a buck convertor and a transformer) in the preferred embodiment (although other output converters may be used). The output of convertor 205 is provided through an inductor 207 to welding output 208.

Figure 3:
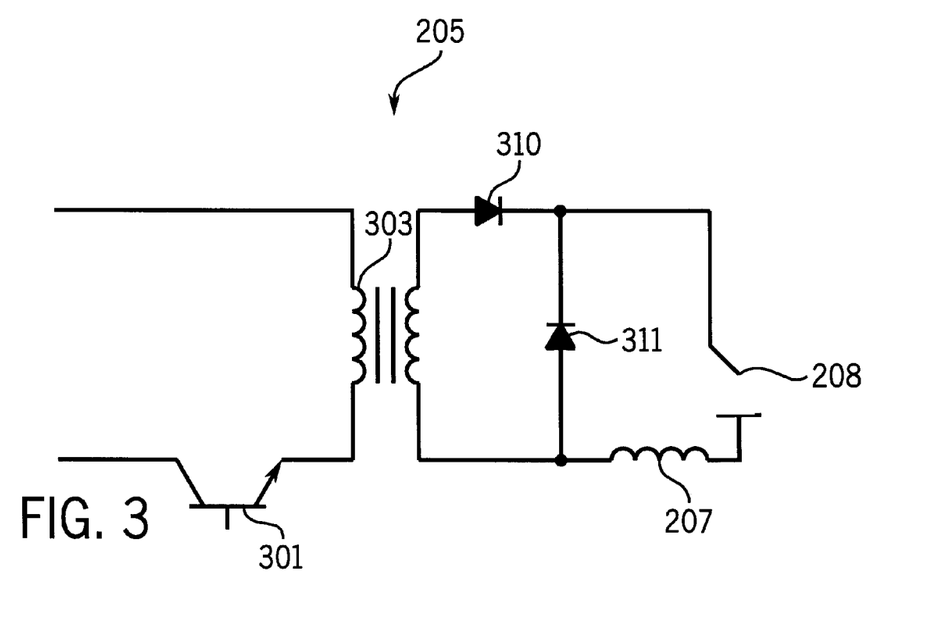
FIG. 3 is a circuit diagram of the output circuit of FIG. 2.

The preferred embodiment of output convertor 205, as shown in FIG. 3, is a single transistor, forward converter. A switch 301, a transformer 303 and a pair of rectifying diodes 310 and 311 comprise the power elements of the converter. Switch 301 and the primary winding 304 of transformer 303 are connected in a buck arrangement. A secondary winding transformer 303, and rectify the transformed power a bridge 308 connected across it. Stabilizing choke 207 is disposed to free-wheel through the diode 207, and thus provide a stable, relatively constant current output. This sort of output convertor is common in welding power supplies.

Transistor 301 turns on and off at a frequency of approximately 25 Khz in the preferred embodiment, thus chopping the 400 VDC bus through transformer 303. The ON/OFF ratio is controlled by a typical pulse-width-modulation (PWM) circuit. The pulse width is adjusted based on the requirements from the feed back control circuit to provide a regulated output current and/or voltage. The chopped voltage is transformed to a lower voltage by transformer 303, and rectified by diodes 310 and 311. This rectified voltage is applied to output choke 207 to provide a filtered output current. Diode 311 carries the current flowing in choke 207 during the "flyback" portion of the switching cycle, when switch 301 is off and not delivering power to the transformer.

Figure 4:
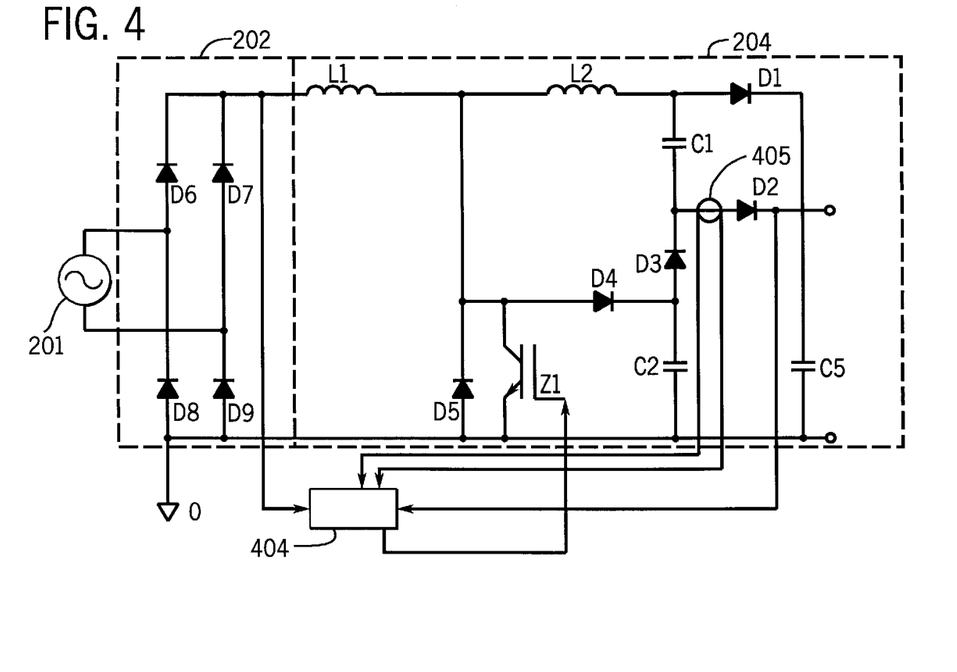
FIG. 4 is a circuit diagram of the pre-regulator of FIG. 2.
Figure 5:
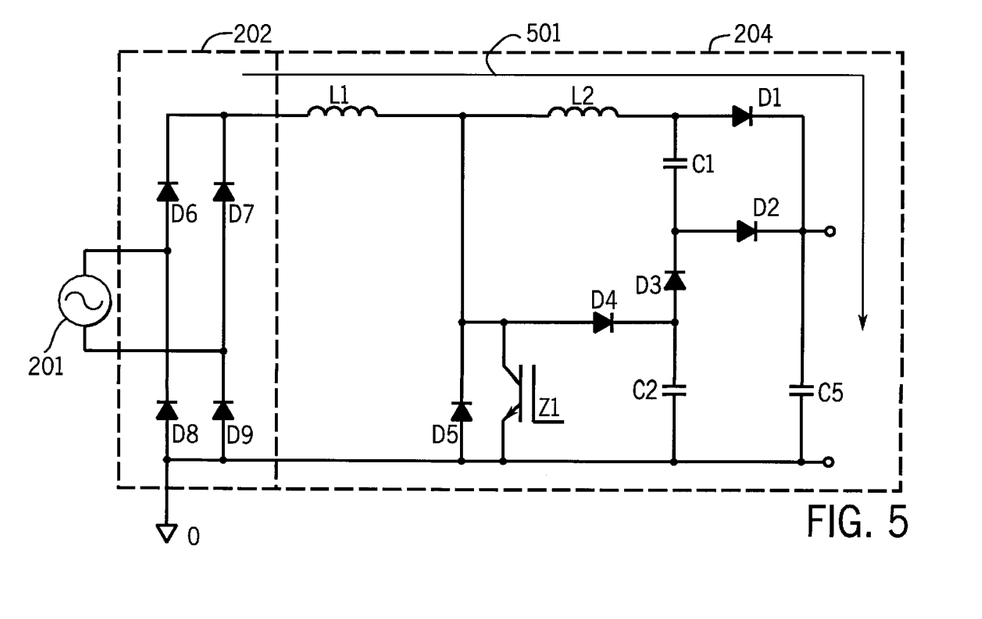
FIGS. 5–13 are the circuit diagram of FIG. 4, showing various current paths.

The circuit used in the preferred embodiment to implement pre-regulator 204 is shown in FIG. 4 (along with rectifier 202 and voltage source 201). The embodiment of FIG. 4 uses a 90–250 volt ac power line as input voltage 201. Rectifier 202 is comprised of diodes D6, D7, D8, and D9, which rectify the input voltage to provide a single polarity sinusoidal input voltage.

The power factor correction portion (described below) of pre-regulator 202 functions best when the input voltage is sinusoidal. Thus, a small (10 $\mu$F) capacitor (not shown) is provided across input rectifier 102 in one embodiment to smooth the input line voltage.

The rectified input voltage is applied to a boost inductor L1 (750 $\mu$H) which is connected with a boost switch Z1 (preferably an IGBT) to form a boost convertor. An antiparallel diode D5 is connected across switch Z1 to protect switch Z1 during transitions. The portion of the circuit which provides the lossless switching includes a snubber inductor L2 (3.9 $\mu$H) a pair of capacitors C1 (1 $\mu$F) and C2 (0.068 $\mu$F), and diodes D1, D2, D3, and D4. Switch Z1 is switched in a known manner such that the output of pre-regulator 204 is a desired voltage, no matter what the input voltage is. The output is provided across a capacitor C5 (2000 $\mu$F) that provides a stable voltage source (400 volts in the preferred embodiment) for the downstream convertor. Also, capacitor C5 prevents the voltage from being dangerously high and damaging switch Z1.

The soft switching of pre-regulator 204 is best understood with reference to FIG. 5–11, which show the circuit with various current paths (states). The first state (FIG. 5) is when switch Z1 is off, and the current (arrow 501) is in a steady state condition through inductors L1 and L2, and diode D1, to charge output capacitor C5 (arrow 501).

Figure 6:
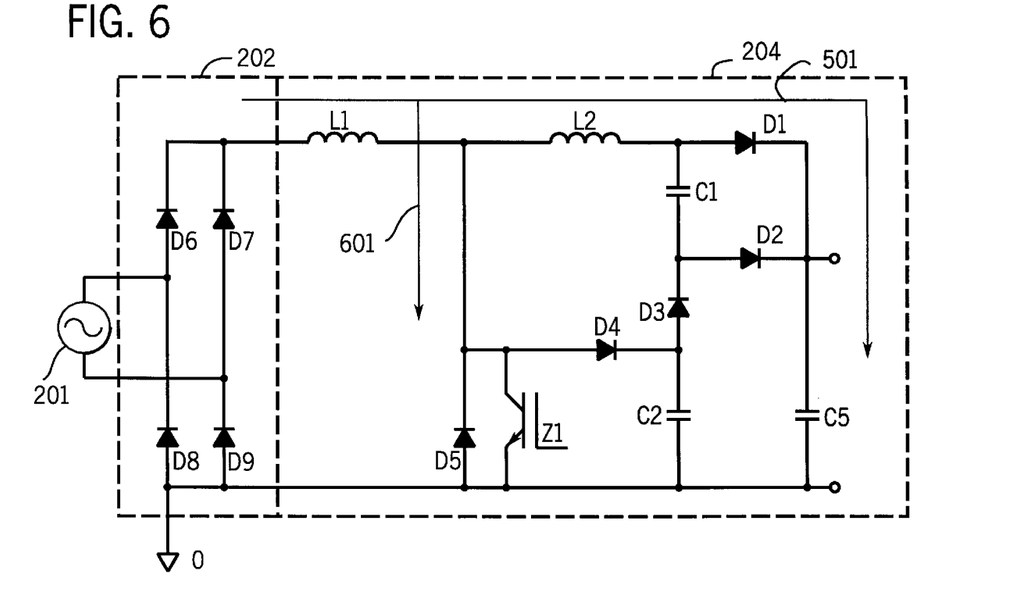

Then, switch Z1 is turned on, and current from inductor L1 begins to be directed through switch Z1 (arrow 601 of FIG. 6). Switch Z1 applies a reverse voltage to inductor L2, causing its current to fall. Thus, the current (in this state) is decreasing through inductor L2 and increasing through switch Z1. Inductor L2 effectively limits or slows the current in switch Z1 at turn on until the switch voltage drops (to close to zero). Thus, the turn on has been a slow-current transition (SCT).

Figure 7:
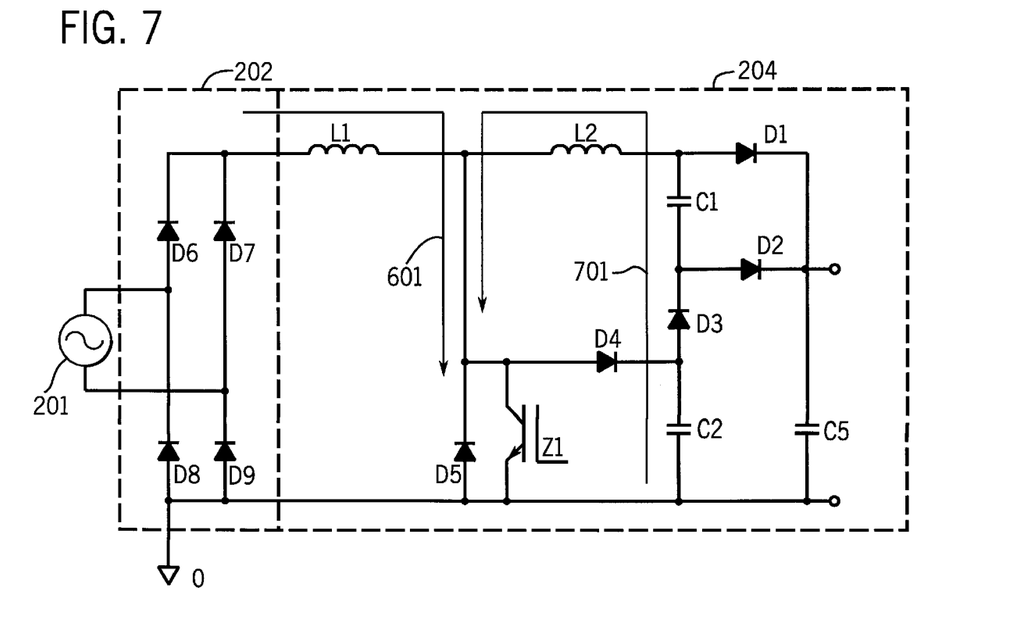

Eventually all of the current from inductor L1 flows through switch Z1, and current in inductor L2 drops until it becomes zero, and then reverses. Capacitor C2 discharges through capacitor C1, diode D3, and inductor L2, as shown in FIG. 7, by arrow 701. Capacitors C1 and C2 allow diode D1 to turn off with a SVT, thus reducing losses. The discharge occurs at a resonant frequency determined by the time constant of the inductance of inductor L2 and the series capacitance of capacitors C1 and C2 ($f=1/(2\pi\sqrt{(L2*(C1+C2)/C1*C2)})$). The time it takes for capacitor C2 to discharge is the ZVT time for diode D1.

Figure 8:
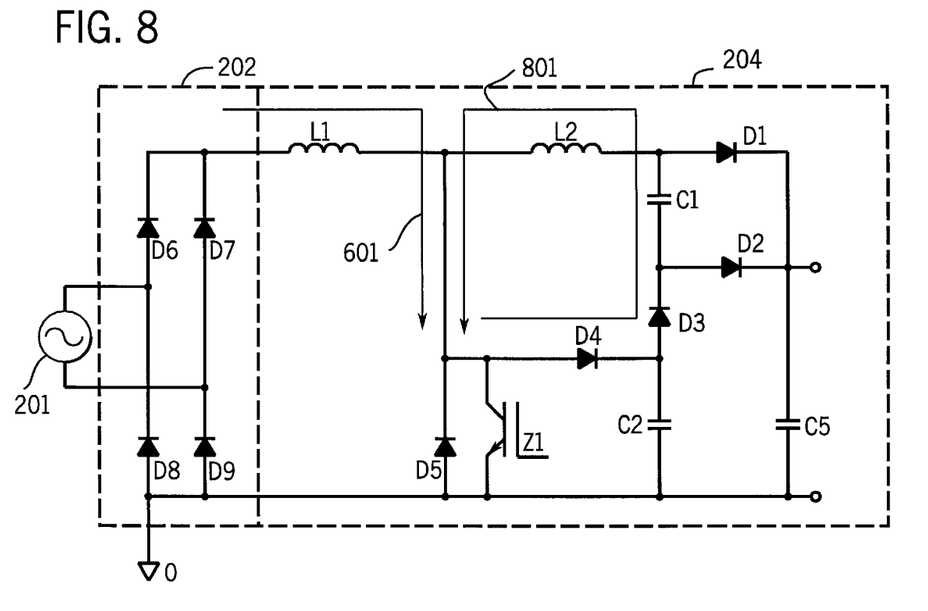

Capacitor C2 discharges to about zero volts, and diode D4 begins to conduct, as shown by arrow 801 in FIG. 8. When diode D4 conducts, inductor L2 releases the energy stored therein to capacitor C1 at a resonant frequency determined by inductor L2 and capacitor C1 ($f=1/(2\pi\sqrt{(L2*C1)})$). The voltage energy on capacitor C1 is transferred to current in inductor L2, and then to voltage on capacitor C1. The ratio of voltage transfer is nearly equal to the capacitance ratio.

Figure 9:
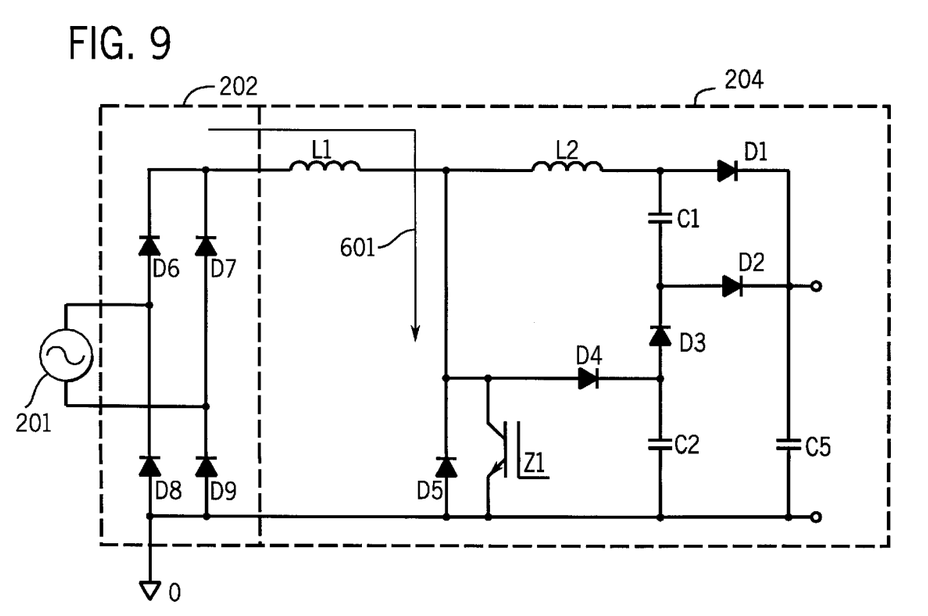
Figure 10:
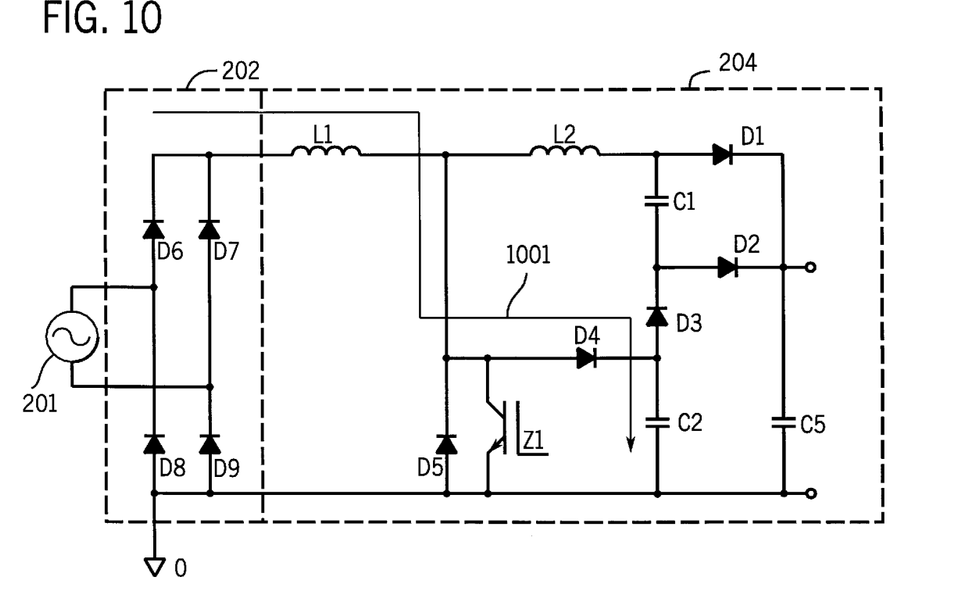

When the charge transfer is complete, and current ceases to flow in snubber inductor L2, the snubber is reset, and current in inductor L1 increases through switch Z1, as shown in FIG. 9. The circuit remains in this state until the switch is turned off.

Next, switch Z1 is turned off, (FIG. 10) and current is diverted through diode D4 and into capacitor C2 (arrow 1001). Capacitor C2 provides the SVT time for switch Z1, thus a soft switching off is provided. The voltage on capacitor C2 continues to rise and eventually reaches the bus voltage (the voltage on capacitor C5) less the voltage on capacitor C1.

Figure 11:
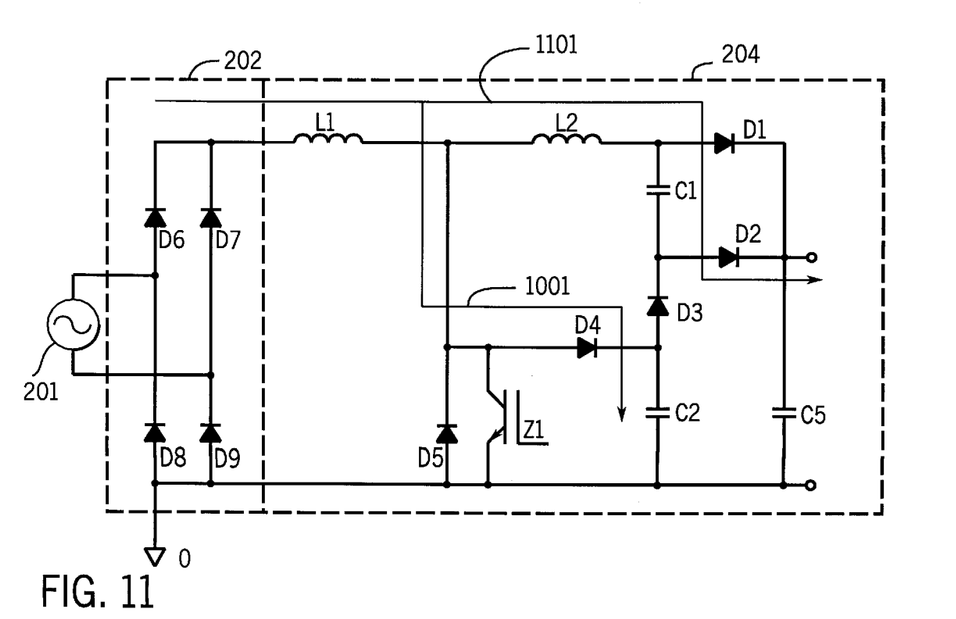

When this happens the voltage on capacitor C1 begins to reestablish the current in inductor L2 (FIG. 11 and arrow 1101). The voltage on capacitor C2 continues to rise until it reaches the bus voltage plus two diode drops.

Figure 12:
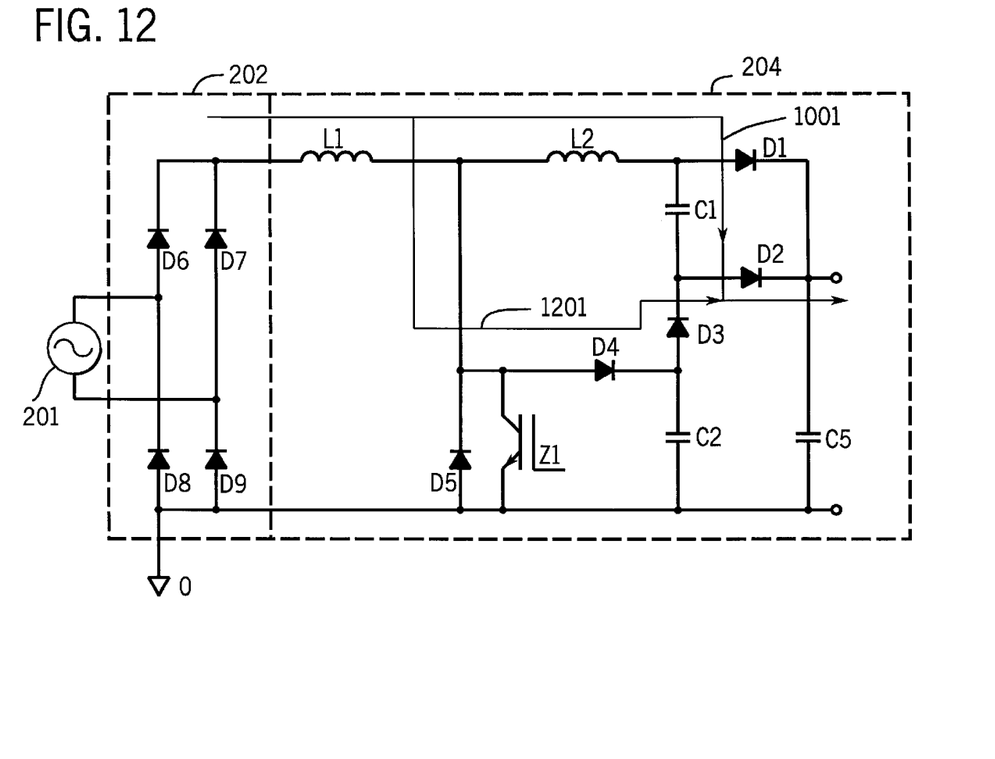

At that time current from inductor L1 not taken by inductor L2 is diverted through diode D3 FIG. 12 and arrow 1201). The voltage on capacitor C1 continues to increase the current in inductor L2.

Figure 13:
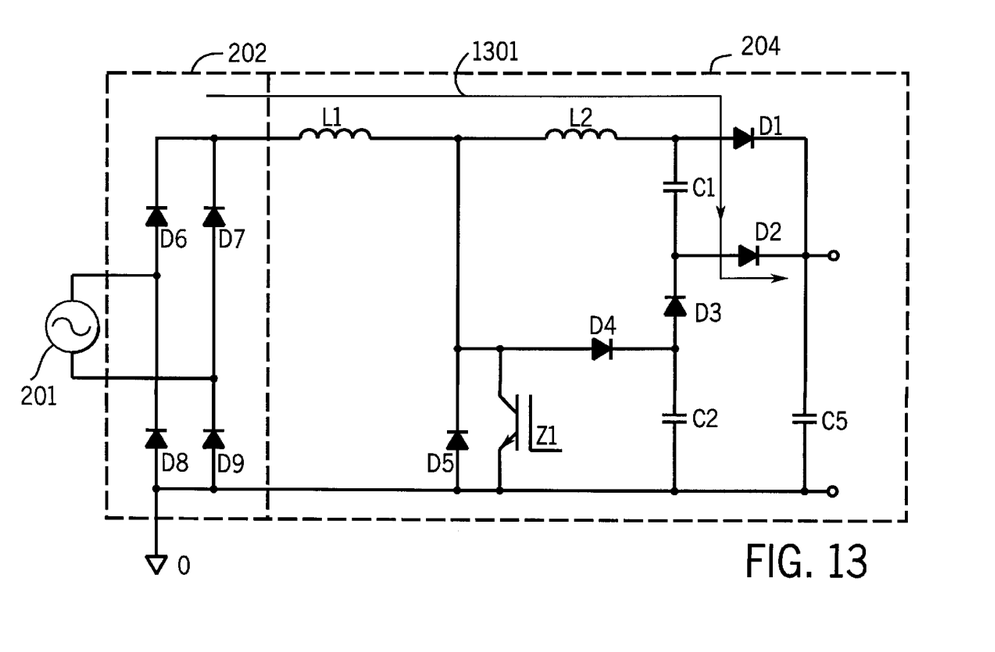

Eventually all of the current from inductor L1 flows through inductor L2, and current through diodes D3 and D4 ceases (FIG. 13). Capacitor C1 continues to give energy to the bus.

When all of the energy on capacitor C1 is expended (to the bus) current flows from inductor L1 to inductor L2, and through diode D1. This is the state initially described, with respect to FIG. 5, and the cycle repeats.

Thus, the voltage rise across switch Z1 was slowed by capacitor C2 to allow the current to drop when switch Z1 was turned off. The current rise in switch Z1 was slowed by inductor L2 to allow the voltage to drop, when switch Z1 was turned on. Moreover, diode D1 was soft-switched by capacitors C1 and C2.

The portion of pre-regulator 204 that provides power factor correction is a power factor correction circuit 404 (FIG. 4), and generally senses the input voltage waveform, and conforms the shape of the current waveform to be that of the voltage waveform. This provides a power factor of very close to 1 (0.99 in the preferred embodiment). Power factor correction circuit 404 may be implemented using an integrated circuit, or with discrete components. Power factor correction circuit 404 receives as inputs the output voltage from rectifier 202, the output voltage from pre-regulator 204, and the output current of pre-regulator 204 (using a CT 405). Because the frequency of pre-regulator 204 (25 Khz) is much higher than that of the line (60 Hz) the pre-regulator current can be made to track the input line voltage shape by sensing the shape of the input voltage, and controlling the input current in response thereto. Thus, the input current is driven to be in phase with the input voltage, and the power factor is close to 1. A high power factor allows larger diameter stick electrodes for a given line power.

One embodiment of this invention provides a safe open circuit voltage by providing an auxiliary source of voltage to the output welding terminals of the welding machine whenever the output terminals are at an open circuit condition (and the output of the machine is on). This energizes the output of the machine without turning on the main inverter power supply circuit, and allows for a safe open circuit voltage. Thus feature is implemented by a welding power source 1600, shown in FIG. 14, that includes an input rectifier 1601, a pre-regulator circuit 1602 (which may be similar to the pre-regulator described herein), a main inverter circuit such as forward converter 205, and an auxiliary OCV supply circuit 1604.

Figure 14:
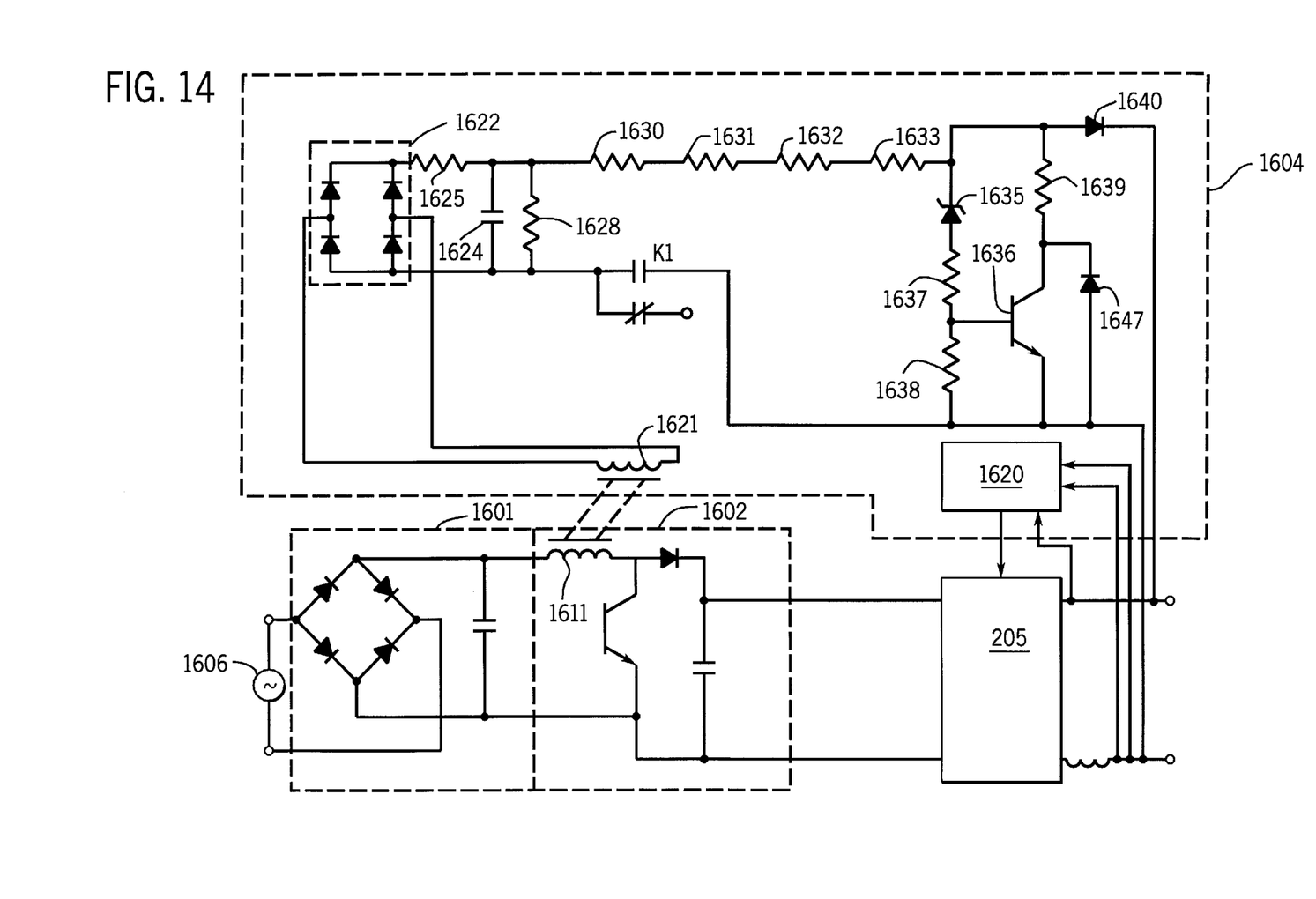
FIG. 14 is a circuit diagram of a power supply having an auxiliary voltage source.

Input rectifier 1602 receives an AC line voltage 1606 and provides its output to pre-regulator 1602. Pre-regulator 1602 is a boost convertor in the preferred embodiment and includes a boost inductor 1611. The output of pre-regulator 1602 is a regulated 400 VDC bus. Forward converter 205 operates as previously described.

Generally, OCV auxiliary circuit 1604 provides safe open circuit output voltage that is sufficient to initiate the arc. The output of auxiliary circuit 1604 is provided whenever the power supply output is on. The presence of the auxiliary OCV allows the main inverter to be shut off when there is no arc. Thus, the sometimes dangerously high main inverter OCV is avoided. A controller 1620, which may be part of or separate from the PWM controller (not shown) that controls the magnitude of the output of inverter 205, determines if an arc is present. If the arc is present the output of inverter 205 is operated in a traditional fashion. However, if no arc is present, the output of inverter 205 is turned off, and the voltage to initiate the arc comes from circuit 1604.

OCV auxiliary circuit 1604 includes a controller 1620 that receives feed back signals indicative of the output voltage and output current. If the output voltage is less than 75 V, or the output current is greater than 1 amp, then controller 1604 determines that an arc is present. If the output voltage is greater then 75 V and the current is less than 1 amp, then controller 1604 determines that the power source is at an open circuit condition.

If an arc is determined to be present, then controller 1604 allows the command signal to be controlled in a normal manner. If an open circuit is found, then controller 1604 holds the command signal to a level such that inverter 205 remains off. Controller 1604 may be fast acting (faster than a traditional PWM control) because it only has to detect, not control, the output. It also has only two states, OCV or NOT OCV.

Auxiliary OCV power supply 1604 develops its power from a second winding 1621 on an input inductor 1611. Pre-regulator 1602 operates to maintain the 400 VDC boosted bus voltage even when there is no load. Thus, circuit 1604 is always able to derive voltage power from winding 1621.

This voltage is rectified by a rectifier 1622, and charges a capacitor 1624 (120 $\mu$F) through a resistor 1625 (10 ohms). A relay K1 applies this voltage to the output terminals of the power source. Relay K1 is energized, closing the normally open contact, whenever an OUTPUT ON signal is high. OUTPUT_ ON is controlled either by an external switch such as a torch mounted switch or foot pedal or by the control switch settings on the front panel.

A plurality of 1630–1633 resistors (500 ohms) limit the amount of current that the OCV supply can deliver, as well as form part of the shunt regulator which regulates the OCV output. An 82 volt zener diode 1635 along with a transistor 1636, and a plurality of resistors 1637 (1K ohms), 1638 (10K ohms), and 1639 (2K ohms) complete the shunt regulator. As the output voltage rises, more current will flow into the base of transistor 1636 through zener diode 1635 and resistor 1632, allowing more current to flow through resistor 1639. This creates a greater voltage drop on resistors 1630–1633, thus keeping the output OCV held to a fixed level of approximately 80 volts. This voltage is applied to the output terminals through a pair of blocking diodes. This maintains the open circuit voltage of the machine at a voltage that is about 80 V, close to DC and with low peak to peak ripple.

The various aspects of this invention, while described in the context of a welding power supply has applications in many different areas. Generally, in applications where low loss switching is desirable using a boost convertor this arrangement may be used.

Numerous modifications may be made to the present invention which still fall within the intended scope hereof. Thus, it should be apparent that there has been provided in accordance with the present invention a method and apparatus for providing power with a high power factor and low switching losses that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding power supply comprising:
    an input rectifier configured to receive an input sinusoidal line voltage and provide a rectified sinusoidal voltage on an output;
    a pre-regulator connected to receive as an input the output of the rectifier and provide a dc bus as an output;
    a convertor, connected to receive the output of the pre-regulator and provide a welding output;
    an auxiliary voltage source connected across the welding output, in parallel with the converter; and
    a controller that shuts the converter down in the event an open circuit condition exists at the output.

2. The power supply of claim 1 wherein the controller includes a voltage feedback input connected to the welding output, and further includes a current feedback input connected to the welding output.

3. The power supply of claim 1 wherein the auxiliary voltage source derives power from the pre-regulator.

4. The power supply of claim 3 wherein the pre-regulator is an SVT switched pre-regulator.

5. The power supply of claim 3 wherein the pre-regulator is an SCT switched pre-regulator.

6. The power supply of claim 5 wherein the pre-regulator includes a power factor correction circuit.

7. A method of providing welding power comprising the steps of:
    rectifying an input sinusoidal line voltage;
    pre-regulating the connected to receive as an input the output of the rectifier and provide a dc bus as an output;
    converting the dc bus to a welding output;
    providing an auxiliary voltage across the welding output, in parallel with the converter; and
    shutting the converter down in the event an open circuit condition exists at the output.

8. The method of claim 7 including the step of providing output voltage feedback and output current feedback.

9. The method of claim 8 including the step of deriving the auxiliary voltage from the pre-regulator.

10. The method of claim 9 include the step of SCT switching the pre-regulator.

11. The method of claim 10 include the step of SVT switching the pre-regulator.

12. The method of claim 9 including the step of power factor correcting.

13. A welding power supply comprising:

rectifier means for rectifying an input sinusoidal line voltage;

pre-regulating means for pre-regulating the output of the rectifier means and providing a dc bus, wherein the pre-regulating means is connected to the rectifier mean;

converting means for converting the dc bus to a welding output, wherein the converting means is connected to the pre-regulating means;

auxiliary voltage means for providing an auxiliary voltage across the welding output, wherein the auxiliary voltage means is parallel with the converting means; and control means for shutting the converter down in the event an open circuit condition exists at the output, wherein the control means is connected to the converter means.

14. The power supply of claim 13 including feedback means for providing output voltage feedback and output current feedback to the control means, wherein the feedback means is connected to the control means.

15. The power supply of claim 13, wherein the auxiliary voltage means includes means for deriving the auxiliary voltage from the pre-regulator means.

16. The power supply of claim 15 wherein the pre-regulator means include SVT switching means for SCT switching the pre-regulator.

17. The power supply of claim 15 wherein the pre-regulator means include SVT switching means for SVT switching the pre-regulator.

18. The power supply of claim 17 wherein the pre-regulator means includes power factor correcting means for power factor correcting.

* * * * *